E. McMILLAN, Jr.
Churn.
No. 59,802. Patented Nov. 20, 1866.
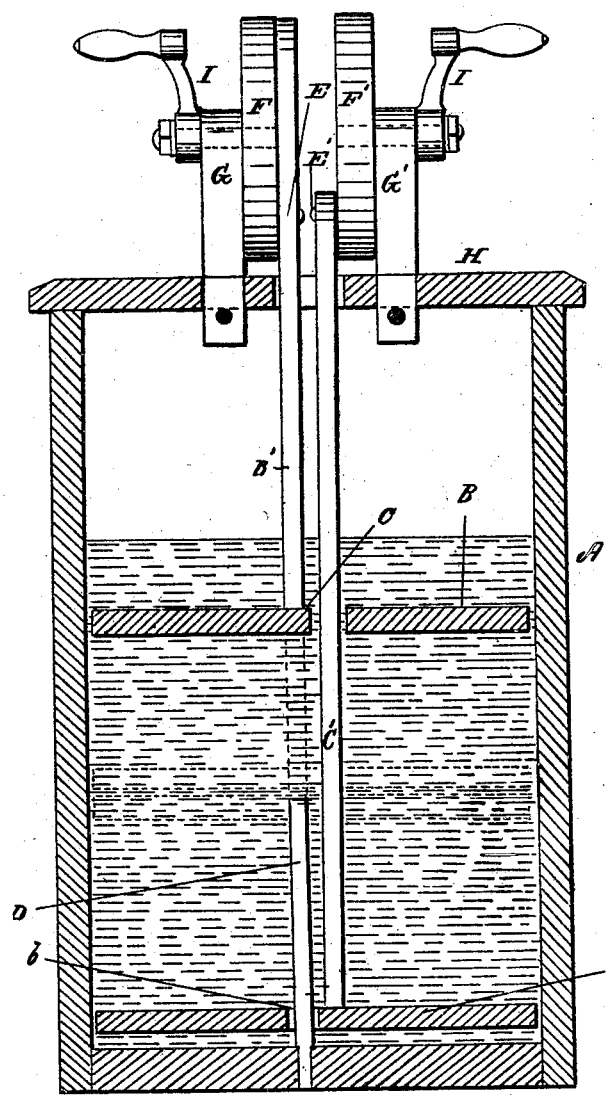

United States Patent Office.

IMPROVEMENT IN CHURNS.

ELI McMILLAN, JR., OF WILMINGTON, OHIO.

Letters Patent No. 59,802, dated November 20, 1866.

SPECIFICATION.

TO WHOM IT MAY CONCERN:

Be it known that I, ELI McMILLAN, Jr., of Wilmington, Clinton county, Ohio, have invented a new and useful Churn; and I do hereby declare the following to be a full, clear, and exact description thereof, reference being had to the accompanying vertical section making a part of this specification:

A is a tub or box which may be circular, square, or of any other form in its horizontal section.

B, C, are two dashers whose shape corresponds to the interior horizontal section of the tub.

D is a standard, which rising from the tub bottom occupies an aperture $b$ in the dasher C, and serves to guide the same in its proper vertical path.

B' and C' are the stems of the respective dashers B and C.

The stem C' of the dasher C passes upward through an aperture in the dasher B, and serves to guide the latter.

The upper end of each stem is pivoted by means of a wrist E (E') to a fly-wheel F (F') journalled in a pedestal G (G') in the lid H of the churn, and having a winch I (I') by which the wheel is turned.

In practice the two wheels are rotated simultaneously in such a way as to cause the two dashers to reciprocate vertically but oppositely in the tub; when one is ascending the other descending, and *vice versa*. The effect of this action is to produce a violent agitation, regurgitation, and beating of the cream. When the dashers are separating there is also a rarefaction of the air between them, which results in a rush of air from the outside into the body of the milk or cream; when, on the other hand, the dashers are approaching each other, the cream is forcibly ejected around the edges of the dashers, causing it to strike violently against the top and bottom of the tub. Finally, when the two dashers strike together at the middle of the tub the cream or butter is closely packed and compressed so as to burst the vesicles and expedite the separation and aggregation of the butter.

From this cause it proves an excellent gathering and butter-working apparatus.

I claim as new, and desire to secure by Letters Patent—

The combination of the imperforate dashers B C, rods B' C', guiding-stem D, fly-wheels F F', and cranks I I', all constructed, arranged, and operating as and for the purpose specified.

In testimony of which invention I hereunto set my hand.

ELI McMILLAN, Jr.

Witnesses.
GEO. H. KNIGHT,
JAMES H. LAYMAN.